June 7, 1949.   J. F. BOUCEK   2,472,401
MICA SPLITTING MACHINE

Filed Jan. 7, 1948   2 Sheets-Sheet 1

INVENTOR:
JAMES F. BOUCEK
BY
Kent W. Worrall
ATT'Y.

June 7, 1949.    J. F. BOUCEK    2,472,401
MICA SPLITTING MACHINE
Filed Jan. 7, 1948    2 Sheets-Sheet 2

*INVENTOR:*
JAMES F. BOUCEK
BY
ATT'Y

Patented June 7, 1949

2,472,401

UNITED STATES PATENT OFFICE 2,472,401

MICA SPLITTING MACHINE

James F. Boucek, Chicago, Ill.

Application January 7, 1948, Serial No. 869

7 Claims. (Cl. 125—24)

This invention relates in general to machines for slicing or splitting thin layers, strips, or laminae from blocks or pieces of material, and although more particularly described as a machine for splitting mica, it is not necessarily limited to this use.

An important object of the invention is to produce a machine which may be set for severing thin sheets from a plurality of blocks in succession.

A further object of the invention is to hold the blocks of material on the supports by suction and to give the supports an oscillating movement as the cutter is moved through the material so that the sheets or strips are more readily removed from the blocks.

Still a further object of the invention is to provide improved means for feeding and altering the feed of the cutter to maintain the same thickness of the removed sheets or strips and to vary this thickness as desired.

Other objects of the invention will appear in the specification and will be apparent from the accompanying drawings in which, Fig. 1 is a top plan view of a machine in accordance with this invention;

Figure 1:
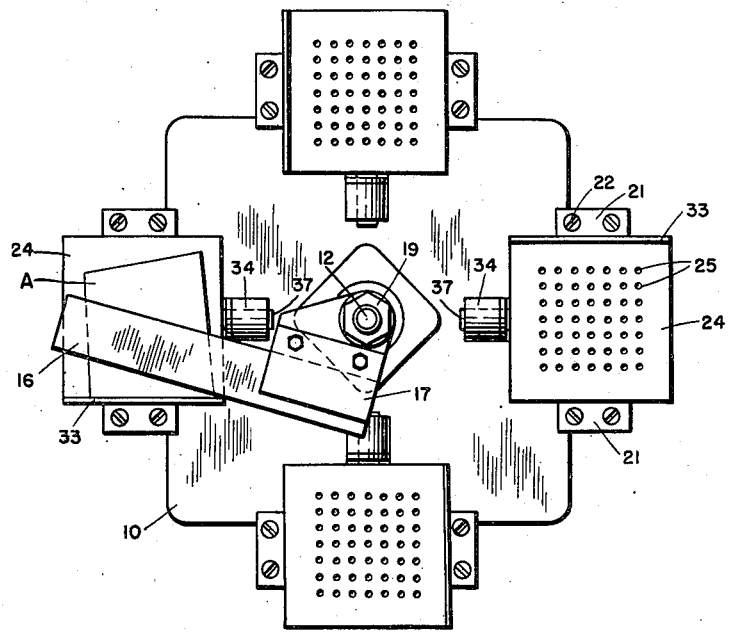

In splitting mica or similar material into thin strips, sheets or pieces for insulation purposes, the best results are obtained by having the splitting blade follow the natural layers of the material. If the material is too rigidly attached to a support, the resistance to the passage of the blade through the material may be unnecessarily great. The present invention overcomes this objection not only by cutting or stripping the strips or pieces from the tops of blocks which are pneumatically held upon a holder, but also agitates the holders during the cutting movement of the blade so that the material layers or pieces are actually severed with a saw-like cutting movement of the blade. This results in a much cleaner severage of the layers of material, requiring less power to operate the machine, and making frequent sharpening of the blade unnecessary.

Referring now more particularly to the drawings, a supporting base 10 as a central bore for receiving a shaft 12 mounted in suitable bearings 13 and 14 at the top and bottom of the base respectively, the shaft projecting above and below the base. At the upper end of the shaft is a cutting blade 16 adjustably and removably secured to the shaft by upper and lower clamps 17 and 18 held tightly together by a fastening nut 19, threaded on the upper end of the shaft. Located radially from the shaft are base projections or supports 20 having opposite guides 21 secured thereto by fastening screws 22 for slidably mounting a specimen holder 24 for axial sliding movement upon each support 20.

Each holder 24 has a number of holes 25 extending through the block and communicating at the bottom with a chamber 26 formed by a bottom plate 28 secured to the holder with a short, hollow stem 30 extending through the plate 28 for connection to a flexible hose 32 for exhausting air from the chamber 26 and through the holes 25. A specimen A of material placed upon the holder is therefore held tightly in place by suction as the cutting blade engages it. At one side of the holder is a marginal ledge 33 to engage the specimen A when held on the holder and to prevent it from being swept from the holder by the engagement of the cutting blade with the material. At the inner edge of each support 20 is a magnet coil 34 supported by a plate 35 secured to the base by a fastening screw 36 and through this coil extends a core 37 projecting from the holder 24. Each magnet coil has conductors 38 and 39 connecting it to a suitable source of current supply for rapidly changing the excitation of the magnet core so that the holder 24 is rapidly vibrated during the time that the cutting blade engages with the material supported by that particular holder.

At the bottom of the base, is a supporting bracket 40 through which the lower end of the shaft 12 projects, and within the bracket and mounted upon the shaft is a worm gear 42 connected to a worm pinion 44 mounted upon a cross shaft 46 for continuously rotating the shaft 12. A collar 48 preferably formed as an extension of the gear 42, extends below the gear and is connected to the shaft by a cross pin 49 extending through a transverse slot 50 in the shaft. Between the bottom of the collar and adjacent the inner edge of the bracket 40 is a washer 51.

With this construction, the shaft 12 is movable endwise without corresponding and moving the worm gear 42.

Mounted on the collar 48 is a cam 52 having a projection 53 for engaging a bar 54 mounted at one end in the bracket 40 and at the other end in another bracket 55 secured to the base 10. This bar is movably mounted in the two brackets and has an enlarged portion 56 with a slot 58 therethrough in which a pawl 59 is pivoted on a cross pin 60. Below the bar is a toothed ratchet wheel 62 engaged by the pawl and mounted on a cross shaft 63 supported by ears 64 projecting downwardly from the bracket 40. A spring 65 connected at one end to the pawl and at the other end to a screw 66 attached to the bar, tends to keep the pawl in engagement with the ratchet wheel 62, the pawl moving over the teeth in one direction of movement of the bar 54 and engaging the teeth in the other direction of movement. Also secured to the shaft 63 is a cam 68 decreasing continuously in diameter throughout its circumference from a high point 69.

Figure 2:
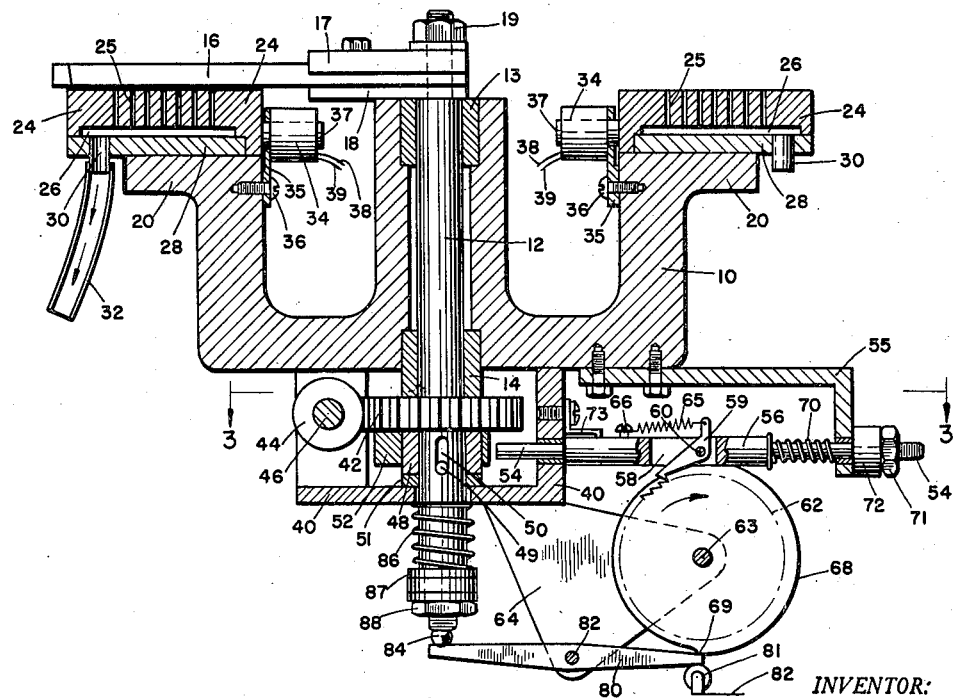
Fig. 2 is a sectional elevation of the machine shown in Fig. 1.

An expanded spiral spring 70 surrounds the bar 54 between the enlarged portion 56 and the adjacent end of the bracket 55, tending to press the bar and the pawl 59 in a direction opposite the feeding movement, the cam 52 moving the bar and the pawl in the opposite direction to feed the ratchet wheel 62 and the cam 68 in the direction of the arrow shown in Fig. 2. At the outer end of the bar 54 is a nut 71 and a resilient buffer 72, if desired, between the nut and the adjacent end of the bracket 55. The other end of the enlarged portion 56 may also abut the outer end of the bracket 40 to limit the movement in this direction of the bar, and a fastening clip 73 may be secured by a screw 74 to the bracket 40 having an extremity 75 which engages in a slot 76 in the outer surface of the bar for preventing it from rotating.

Figure 3:
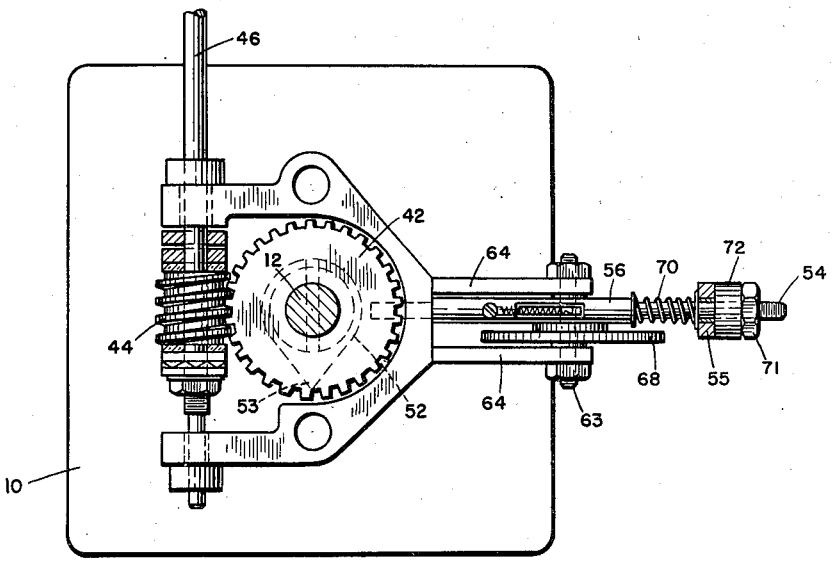
Fig. 3 is a plan section taken on the line 3—3 of Fig. 2.
Figure 4:
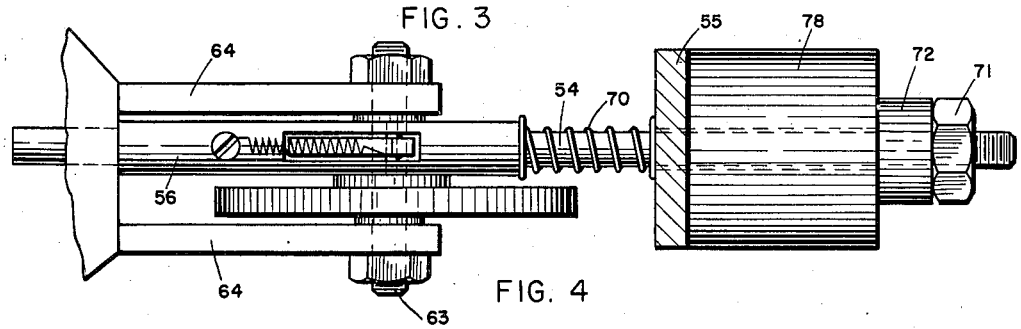
Fig. 4 is an enlarged view of a portion of the mechanism shown in Fig. 3, including an operating solenoid.
Figure 5:
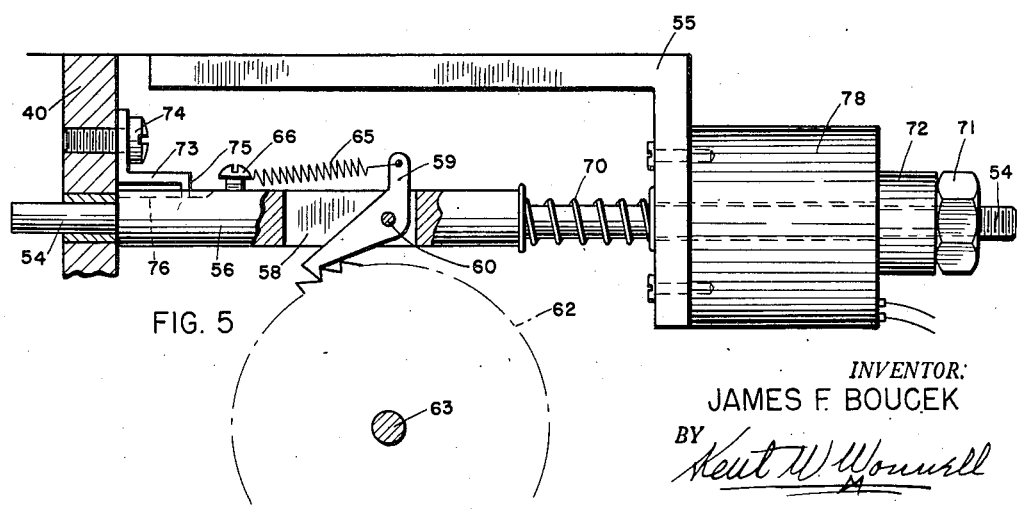
Fig. 5 is a side elevation, partly in section of the structure shown in Fig. 4.

Instead of employing a cam 52 for actuating the bar 54, an electrical magnet winding 78 may be supported by the outer end of the bracket 55 as shown in Figs. 3 and 4 which will draw the bar 55 outwardly against the tension of the spring 70 which returns it. In this case, the outer end of the bar will be extended sufficiently to project through and beyond the winding 78.

Engaging the cam 68 at a point opposite the pawl 59 is a follower lever 80 mounted intermediate its ends upon a pivot 82 supported by the ears 64 projecting from the bracket 40. The lever may be maintained in engagement with the cam by a roller 81 mounted upon a fixed support 82 and since the cam is rotated in a direction to decrease the constantly decreasing distance of the contact end of the follower from an axis of the cam, the opposite end of the lever will be lowered with respect to the shaft 12. A ball bearing 84 is interposed between the end of the lever and the lower end of the shaft so that the constant lowering movement is communicated to the shaft. The shaft is pressed downwardly by a spiral spring 86 surrounding the lower end of the shaft abutting the under surface of the bracket 40 at one end and abutting a washer 87 held in place by a nut 88 thereto on the lower end of the shaft.

With this construction, the shaft and the knife blade 16 carried thereby will be continuously lowered as the shaft is rotated, thereby cutting a thin strip, depending upon the graduation of the cam 68 from the block of material held by each of the successive holders.

Suction may be applied to each of the holders in succession just before they are reached by the knife or they may be continuously applied to the holders as long as the knife is rotating. Likewise, the holders may be continuously agitated by the magnet windings 34, or they may be agitated only during the time that the knife passes over that particular holder. If the feeding bar 54 is actuated by a solenoid 78 instead of the cam 52, the solenoid may be connected for actuation at one point in the rotation of the blade 16 or the shaft 12 since the same feeding actuation will be applied to all of the material holders in succession.

With this construction, different thicknesses may be cut or sliced from the specimens depending upon the surface of the cam 68, and one cam may be substituted for another by simply removing the supporting shaft 63.

While a preferred construction of this machine has been described for the purpose of splitting mica, it should be regarded by way of illustration and example as the machine may also be applied for cutting and slicing other materials, and not as a restriction or limitation of the invention, as various changes in the construction, combination and arrangement of the parts may be made without departing from the spirit and scope of the invention.

I claim:

1. In a mica splitting machine, a rotatable shaft, a cutting blade carried by the upper end of the shaft, a base through which the shaft extends having supports disposed radially from the shaft in the path of the blade, a suction block mounted for sliding movement on each support, means for rapidly agitating each suction block, and means for feeding the cutting blade downwardly to slice a predetermined thickness of material from a block thereof held by suction on the suction block.

2. In a mica splitting machine, a base having a central opening and supports disposed radially from the opening, a shaft extending through the central opening, a cutting blade attached at the upper end of the shaft and movable over the supports when the shaft is rotated, means for rotating the shaft, means for feeding the blade and shaft downwardly from an elevated position, an article holding suction block slidably mounted upon the upper side of each support having suction holes through the block and a suction tube extending therefrom, and electro-magnet means for rapidly agitating the block with respect to the support as the blade is rotated over the block to sever an upper layer of material from an article held on the block by suction.

3. A mica splitting machine, comprising a base having a central opening and a plurality of supports disposed radially around the opening, a suction block and means for slidably mounting it upon each support, electro-responsive means for agitating the suction block with respect to the support, a rotatable shaft mounted in the central opening and carrying a blade at its upper end which is rotatable with the shaft to engage articles held by suction upon said blocks, and means engaging the shaft at the lower end for lowering it continuously to cut a predetermined amount from an article held by suction upon each block as the cutting blade reaches that block in its path of rotation.

4. In a mica splitting machine, a base having a central opening and a plurality of supports spaced radially from the opening, a suction block slidably mounted at the upper end of each support, electro-responsive means for agitating the block with respect to the support, a shaft with a cutting blade at the upper end movable over the suction blocks upon the support, the lower end of the shaft projecting below the base, means below the base for engaging and rotating the shaft, said means including a worm gear with a collar projecting therefrom, the shaft having a transverse slot therethrough and a bearing pin extending through the shaft and into the collar to permit a longitudinal movement of the shaft with respect to the collar, and means for engaging the lower end of the shaft to lower the shaft continuously as it is rotated.

5. In a mica splitting machine, a base having a central opening and a plurality of supports spaced radially from the opening, a suction block slidably mounted at the upper end of each support, electro-responsive means for agitating the block with respect to the support, a shaft with a cutting blade at the upper end movable over the suction blocks upon the support, the lower end of the shaft projecting below the base, means below the base for engaging and rotating the shaft, said means including a worm gear with a collar projecting therefrom, the shaft having a transverse slot therethrough and a bearing pin extending through the shaft and into the collar to permit a longitudinal movement of the shaft with respect to the collar, means engaging the shaft for rotating it and permitting a longitudinal raising and lowering movement of the shaft, spring means tending to lower the shaft and a cutting blade, lever means engaging the lower end of the shaft, and a rotatable cam to engage the lever means for lowering the shaft a predetermined amount at each rotation thereof.

6. In a mica splitting machine, a base having a central opening and a plurality of supports spaced radially from the opening, a holder on each support for pieces of material, a shaft extending through the opening and having a blade at the upper end movable over the material to be sliced on the blocks, means below the base to engage the shaft for rotating it and including a collar with a pin connected thereto and extending through a longitudinal slot in the shaft to permit relative movement of the shaft with respect to the collar, a cam mounted on the collar, a bar engaged by the cam, ratchet means including a wheel rotated by the bar, a cam connected to the ratchet wheel, a lever pivoted intermediate its ends having one end in engagement with the last named cam, and the other end in engagement with the end of the shaft to lower the shaft in accordance with the movement of the cam connected to the ratchet wheel.

7. In a mica splitting machine, a base having an opening therethrough and a plurality of supports arranged radially with respect to the opening, an article carrying block slidably mounted upon each support, electro-responsive means for agitating the block with respect to the support, a shaft extending through the central opening having a blade at its upper end adapted to move over articles on the blocks when the shaft is rotated, means for rotating the shaft and permitting a limited endwise movement, a longitudinally movable bar and means including a spring and an electro-responsive device for reciprocating the bar, a pawl connected to the bar, a ratchet wheel engaged by the pawl, a cam in connection with the ratchet wheel, a lever pivoted between its ends having one end in engagement with the cam, and the other end in engagement with the lower end of the shaft, and spring means tending to press the shaft downwardly holding the lever in engagement with the cam.

JAMES F. BOUCEK.

No references cited.